(12) United States Patent
Zhang et al.

(10) Patent No.: US 11,417,114 B2
(45) Date of Patent: Aug. 16, 2022

(54) METHOD AND APPARATUS FOR PROCESSING INFORMATION

(71) Applicant: Apollo Intelligent Driving Technology (Beijing) Co., Ltd., Beijing (CN)

(72) Inventors: Shuang Zhang, Beijing (CN); Xiang Liu, Beijing (CN); Bin Gao, Beijing (CN); Xiaoxing Zhu, Beijing (CN); Jingjing Xue, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 60 days.

(21) Appl. No.: 16/914,082

(22) Filed: Jun. 26, 2020

(65) Prior Publication Data

US 2021/0089793 A1    Mar. 25, 2021

(30) Foreign Application Priority Data

Sep. 19, 2019   (CN) .......................... 201910885478.X (51) Int. Cl.
*G06V 20/58*   (2022.01)
*G01S 17/04*   (2020.01)
*G06V 10/75*   (2022.01)

(52) U.S. Cl.
CPC .............. *G06V 20/58* (2022.01); *G01S 17/04* (2020.01); *G06V 10/757* (2022.01)

(58) Field of Classification Search
CPC ... G06K 9/00805; G06K 9/6211; G01S 17/04
See application file for complete search history.

(56) References Cited

U.S. PATENT DOCUMENTS

| | | | |
|---|---|---|---|
| 10,086,809 B1 | 10/2018 | Prasad | |
| 10,634,793 B1* | 4/2020 | Siao | ........................ G06T 5/002 |
| 2010/0066587 A1* | 3/2010 | Yamauchi | ............. G01S 13/867 |
| | | | 342/70 |
| 2017/0314930 A1* | 11/2017 | Monterroza | ......... G06N 3/0454 |
| 2019/0087666 A1* | 3/2019 | Zhang | .................. G05D 1/0088 |
| 2019/0291743 A1* | 9/2019 | Druml | .................. G01S 7/4073 |
| 2021/0035310 A1* | 2/2021 | Choi | ........................ G06T 7/251 |
| 2021/0132197 A1* | 5/2021 | Wachter | ................ G01S 17/931 |

FOREIGN PATENT DOCUMENTS

| | | |
|---|---|---|
| WO | 2018/055449 A2 | 3/2018 |
| WO | 2018/127789 A1 | 7/2018 |

* cited by examiner

*Primary Examiner* — Santiago Garcia
(74) *Attorney, Agent, or Firm* — Kilpatrick Townsend & Stockton LLP (57) ABSTRACT

A method and apparatus for processing information are provided. A specific embodiment of the method includes: identifying at least one obstacle from a point cloud collected by a lidar during a traveling process of a vehicle; for an obstacle in the at least one obstacle, determining an appearance rate of the obstacle within a life cycle corresponding to the obstacle; determining a confidence degree of a grid region of at least one grid region based on appearance rates of obstacles in the at least one obstacle; determining a target grid region from the at least one grid region based on the confidence degree, and determining whether an obstacle detected in the target grid region is an obstacle detected for a first time; and if yes, filtering out a point cloud corresponding to the obstacle detected in the target grid region for the first time.

18 Claims, 5 Drawing Sheets

METHOD AND APPARATUS FOR PROCESSING INFORMATION

CROSS-REFERENCE TO RELATED APPLICATIONS

This application claims priority to Chinese Patent Application No. 201910885478.X, filed with the China National Intellectual Property Administration (CNIPA) on Sep. 19, 2019, the contents of which are incorporated herein by reference in their entirety.

TECHNICAL FIELD

Embodiments of the present disclosure relate to the field of computer technology, and in particular to, a method and apparatus for processing information.

BACKGROUND

In an application scenario of autonomous driving, an obstacle on a road can be sensed using a lidar. For example, an autonomous vehicle may be provided with a lidar (e.g., a single-beam lidar) at a position of a preset height above the ground, for detecting low obstacles. Ideally, a laser beam emitted by the lidar should be parallel to the horizontal plane. However, due to restrictions on, e.g., the installation process, at present, it is impossible to guarantee that the laser beam emitted by the lidar is parallel to the horizontal plane. Generally, there will be an angle between the laser beam emitted by the lidar and the horizontal line, which will lead to false detection of the obstacle, thereby affecting the normal driving of the autonomous vehicle.

SUMMARY

Some embodiments of the present disclose provide a method and apparatus for processing information.

According a first aspect, some embodiments of the present disclosure provide a method for processing information, including: identifying at least one obstacle from a point cloud, the point cloud being collected by a lidar during a traveling process of a vehicle; for an obstacle in the at least one obstacle, determining an appearance rate of the obstacle within a life cycle corresponding to the obstacle, the life cycle corresponding to the obstacle referring to a process from the obstacle being detected until the obstacle disappearing; determining a confidence degree of a grid region of at least one grid region based on appearance rates of obstacles in the at least one obstacle, the at least one grid region being obtained by dividing a collection area of the lidar; determining a confidence degree of a grid region of at least one grid region based on appearance rates of obstacles in the at least one obstacle, the at least one grid region being obtained by dividing a collection area of the lidar; and in response to determining the obstacle detected in the target grid region being the obstacle detected for the first time, filtering out a point cloud corresponding to the obstacle detected in the target grid region for the first time.

In some embodiments, the method further includes: in response to determining the obstacle detected in the target grid region not being the obstacle detected for the first time, sending control information to the vehicle based on the obstacle detected in the target grid region, to control the traveling of the vehicle.

In some embodiments, where the in response to determining the obstacle detected in the target grid region not being the obstacle detected for the first time, sending control information to the vehicle based on the obstacle detected in the target grid region, to control the traveling of the vehicle includes: for the obstacle in the at least one obstacle, executing following to determine the appearance rate: establishing a tracking list for the obstacle based on the point cloud, wherein the tracking list includes appearing times of the obstacle during the process from the obstacle being detected until the obstacle disappearing; and determining the appearance rate of the obstacle within the life cycle corresponding to the obstacle based on the appearing times of the obstacle recorded in the tracking list.

In some embodiments, where the establishing a tracking list for the obstacle based on the point cloud includes: based on the point cloud, in response to determining the obstacle being detected, determining whether the detected obstacle is a tracked obstacle; in response to determining the detected obstacle being a tracked obstacle, recording an appearing time of the detected obstacle and a grid region in which the obstacle is located when the obstacle appears into the tracking list that has been set for the obstacle; and in response to determining the obstacle not being the tracked obstacle, setting a tracking list for the detected obstacle, and recording the appearing time of the detected obstacle and the grid region in which the detected obstacle is located when the detected obstacle appears into the set tracking list.

In some embodiments, where the determining a confidence degree of a grid region of at least one grid region based on the appearance rates of the obstacles of the at least one obstacle includes: for the grid region of the at least one grid region, executing following steps to determine the confidence degree: counting, based on tracking lists of the obstacles in the at least one obstacle, a number of obstacles having appeared in the grid region, wherein a tracking list includes a grid region in which the obstacle is located from the obstacle being detected until the obstacle disappearing; determining a sum of appearance rates of the obstacles having appeared in the grid region; and computing a ratio of said sum to said number, and using the obtained ratio as the confidence degree of the grid region.

In some embodiments, where the determining a target grid region from the at least one grid region based on the confidence degree includes: selecting a grid region with a confidence degree less than a preset threshold from the at least one grid region, for use as a target grid region.

According to a second aspect, some embodiments of the present disclosure provide an apparatus for processing information, the apparatus including: an identifying unit configured to identify at least one obstacle from a point cloud, the point cloud being collected by a lidar during a traveling process of a vehicle; a first determining unit configured to determine, for an obstacle in the at least one obstacle, an appearance rate of the obstacle within a life cycle corresponding to the obstacle, the life cycle corresponding to the obstacle referring to a process from the obstacle being detected until the obstacle disappearing; a second determining unit configured to determine a confidence degree of a grid region of at least one grid region based on appearance rates of obstacles in the at least one obstacle, the at least one grid region being obtained by dividing a collection area of the lidar; a third determining unit configured to determine a target grid region from the at least one grid region based on the confidence degree, and determine whether an obstacle detected in the target grid region is an obstacle detected for a first time; and a filtering unit configured to filter out, in response to determining the obstacle detected in the target grid region being the obstacle detected for the first time, a point cloud corresponding to the obstacle detected in the target grid region for the first time.

In some embodiments, the apparatus further includes: a sending unit configured to send, in response to determining the obstacle detected in the target grid region not being the obstacle detected for the first time, control information to the vehicle based on the obstacle detected in the target grid region, to control the traveling of the vehicle.

In some embodiments, the first determining unit is further configured to execute, for the obstacle in the at least one obstacle, preset appearance rate determining steps, and the first determining unit includes: an establishing unit configured to establish a tracking list for the obstacle based on the point cloud, wherein the tracking list includes appearing times of the obstacle during the process from the obstacle being detected until the obstacle disappearing; and an appearance rate determining unit configured to determine the appearance rate of the obstacle within the life cycle corresponding to the obstacle based on appearing times of the obstacle recorded in the tracking list.

In some embodiments, the establishing unit is further configured to: determine, based on the point cloud, in response to determining the obstacle being detected, whether the detected obstacle is a tracked obstacle; in response to determining the detected obstacle being a tracked obstacle, record an appearing time of the detected obstacle and a grid region in which the obstacle is located when the obstacle appears into the tracking list that has been set for the obstacle; and in response to determining the obstacle not being the tracked obstacle, set a tracking list for the detected obstacle, and record the appearing time of the detected obstacle and the grid region in which the detected obstacle is located when the detected obstacle appears into the set tracking list.

In some embodiments, the second determining unit is further configured to: for the grid region of the at least one grid region, execute following steps to determine the confidence degree: count, based on tracking lists of the obstacles in the at least one obstacle, a number of obstacles having appeared in the grid region, wherein a tracking list includes a grid region in which the obstacle is located from the obstacle being detected until the obstacle disappearing; determining a sum of appearance rates of the obstacles having appeared in the grid region; and computing a ratio of said sum to said number, and using the obtained ratio as the confidence degree of the grid region.

In some embodiments, the third determining unit is further configured to: select a grid region with a confidence degree less than a preset threshold from the at least one grid region, for use as the target grid region.

According to a third aspect, some embodiments of the present disclosure provide an electronic device, including one or more processors; and a storage apparatus, storing one or more programs thereon, wherein the one or more programs, when executed by the one or more processors, cause the one or more processors to implement the method according to any one of the implementations described in the first aspect.

According to a fourth aspect, some embodiments of the present disclosure provide a computer-readable medium, storing a computer program thereon, where the program implements, when executed by a processor, the method according to any one of the implementations described in the first aspect.

The method and apparatus for processing information provided by embodiments of the present disclosure first identify at least one obstacle from a point cloud, the point cloud being collected by a lidar during a traveling process of a vehicle, then determine, for each obstacle in the at least one obstacle, an appearance rate of the obstacle within a life cycle corresponding to the obstacle, then determine a confidence degree of a grid region of at least one grid region based on the appearance rate of each obstacle in the at least one obstacle, and finally determine a target grid region from the at least one grid region based on the confidence degree, and determine whether an obstacle detected in the target grid region is an obstacle detected for a first time, and filter out, in response to determining the obstacle detected in the target grid region being the obstacle detected for the first time, a point cloud corresponding to the obstacle detected in the target grid region for the first time, thereby effectively filtering out a point cloud of the obstacle detected for the first time in the target grid region with a low confidence degree, and reducing the impact of false detection of the obstacle on the driving of the vehicle.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
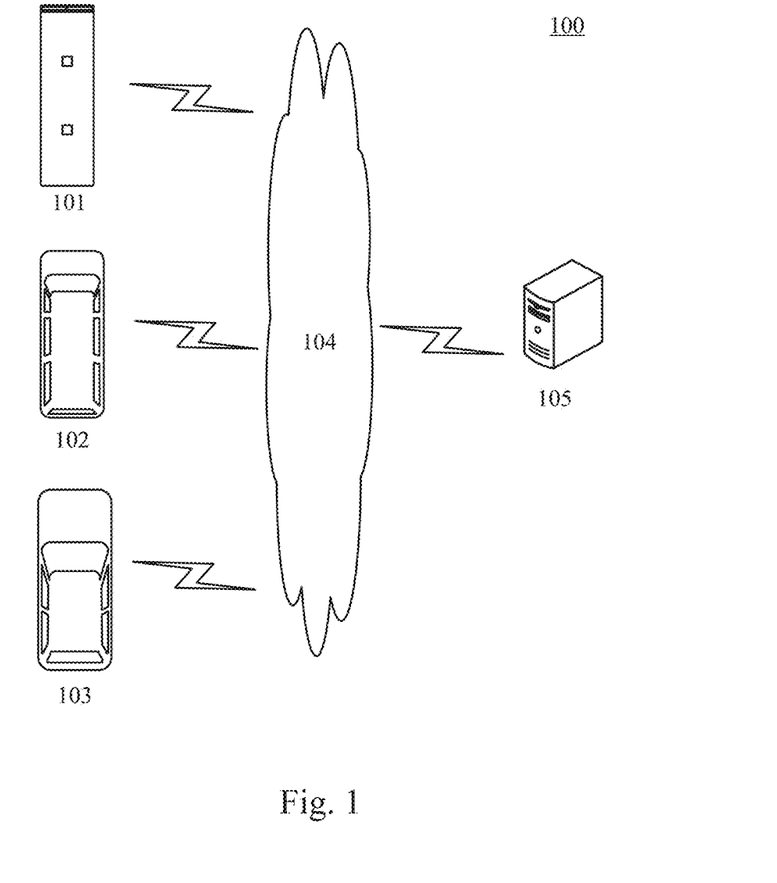
FIG. 1 is a diagram of an example system architecture in which an embodiment of the present disclosure may be implemented.

FIG. 1 shows an example system architecture 100 in which a method for processing information or an apparatus for processing information according to some embodiments of the present disclosure may be applied.

As shown in FIG. 1, the system architecture 100 may include an vehicle 101, 102 or 103, a network 104, and a server 105. The network 104 serves as a medium providing a communication link between the vehicle 101, 102 or 103, and the server 105. The network 104 may include various types of connections, such as wired or wireless communication links, or optical cables.

The vehicles 101, 102, and 103 may interact with the server 105 via the network 104, for example, to receive or send a message. The vehicles 101, 102, 103 may be provided with various information collecting apparatuses, such as an image capturing apparatus, a binocular camera, a sensor, and a lidar. The above information collecting apparatus can be used for collecting environmental information inside and outside the vehicle 101, 102 or 103. The vehicles 101, 102, and 103 may also be provided with an in-vehicle smart controller (not shown in the figure). The in-vehicle smart controller can receive the information collected by the information collecting apparatus, process, e.g., analyze, the information, and then control the vehicle 101, 102 or 103 to perform a corresponding operation (e.g., continue driving or emergency stop) based on a processing result. The vehicles 101, 102, and 103 may be vehicles that include an autonomous driving mode, including both fully autonomous vehicles and vehicles that can be switched to the autonomous driving mode.

The vehicles 101, 102, and 103 may be various types of vehicles, including but not limited to a large bus, a motor tractor, a city bus, a medium bus, a large truck, a compact car, and the like.

The server 105 may be a server that provides various services, such as a back-end server for processing information sent by the vehicles 101, 102, and 103. The back-end server can perform various kinds of analysis and processing on the received information, and send control information to the vehicles 101, 102, and/or 103 based on the processing result, to control the vehicles 101, 102, and/or 103.

It should be noted that the server 105 may be hardware, or may be software. When the server 105 is hardware, the server may be implemented as a distributed server cluster composed of a plurality of servers, or may be implemented as a single server. When the server 105 is software, the server may be implemented as a plurality of software programs or software modules (e.g., software programs or software modules for providing distributed services), or may be implemented as a single software program or software module. This is not specifically limited here.

It should be understood that the numbers of vehicles, networks, and servers in FIG. 1 are merely illustrative. Any number of vehicles, networks, and servers may be provided based on actual requirements.

It should be noted that the method for processing information provided by some embodiments of the present disclosure may be executed by the in-vehicle smart controller provided on the vehicles 101, 102, and 103, or may be executed by the server 105. Accordingly, the apparatus for processing information may be provided in the in-vehicle smart controller of the vehicles 101, 102, and 103, or may be provided in the server 105.

Figure 2:
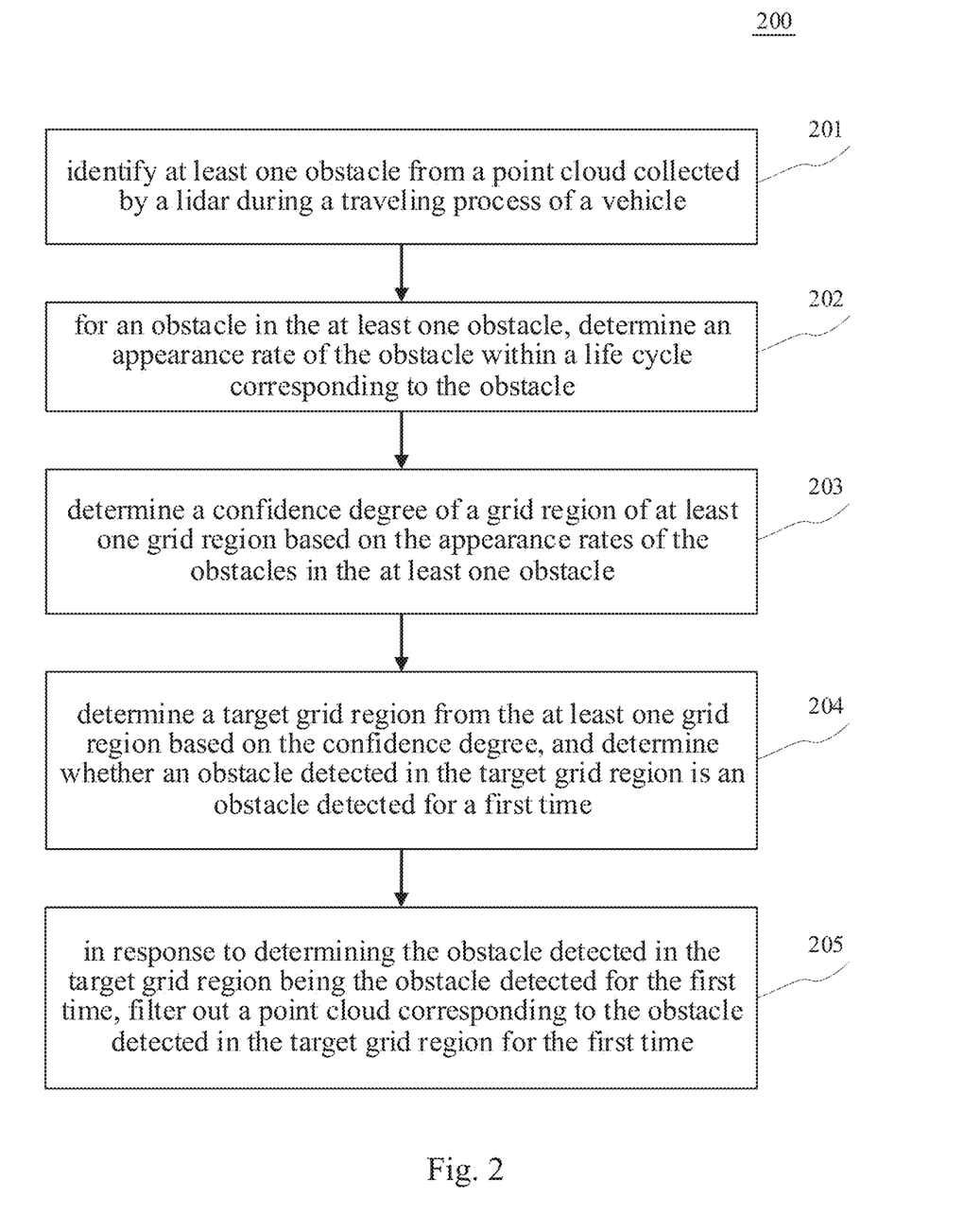
FIG. 2 is a flowchart of a method for processing information according to an embodiment of the present disclosure.

Further referring to FIG. 2, a process 200 of a method for processing information according to an embodiment of the present disclosure is shown. The method for processing information includes the following steps:

Step 201: identifying at least one obstacle from a point cloud, the point cloud being collected by a lidar in a travelling process of a vehicle.

In the present embodiment, the executing body (e.g., the in-vehicle smart controller of the vehicles 101, 102, and 103, or the server 105 shown in FIG. 1) of the method for processing information may acquire, through wired connection or wireless connection, the point cloud collected by the lidar during the traveling process of the vehicle, and identify at least one obstacle from the collected point cloud.

In practice, a vehicle may be provided with a lidar at a position of a preset height above the ground. The lidar may be a single-beam lidar, or may be a multi-beam lidar. The single-beam lidar may refer to a radar with a laser source emitting single-beam laser. The single-beam lidar can perform planar scanning. Thus, in the traveling process of the vehicle, the lidar can collect point cloud of objects in the environment around the vehicle in real time. The executing body can receive the point cloud collected by the lidar in real time, and perform obstacle identification and tracking for each received frame of point cloud, to identify which pieces of point data in the point cloud are used for describing the obstacle.

Step 202: for an obstacle in the at least one obstacle, determining an appearance rate of the obstacle within a life cycle corresponding to the obstacle.

In the present embodiment, for each obstacle in the at least one obstacle identified in step 201, the executing body can determine the appearance rate of the obstacle within a life cycle corresponding to the obstacle. Here, the life cycle corresponding to the obstacle may refer to a process from the obstacle being detected until the obstacle disappearing. Here, the obstacle disappearing may mean that after the obstacle is detected, the obstacle is not detected in a preset number of consecutively collected frames (e.g., 2 consecutively collected frames) of point cloud. Generally, after an obstacle is detected in a frame of point cloud, the obstacle will be tracked in each subsequently collected frame of point cloud, and if the obstacle is not found in a preset number of subsequently consecutively collected frames of point cloud, then it indicates that the obstacle disappears, and the life cycle of the obstacle is terminated. In practice, due to obstacle instability, or noise, etc., the obstacle failing to be found in some frames of point cloud may arise during a period from when the obstacle is detected until the obstacle disappears. The appearance rate of the obstacle within the corresponding life cycle may refer to a ratio of the number of frames in which the obstacle appears within the corresponding life cycle to a total number of frames within the corresponding life cycle. For example, assuming that an obstacle is detected in a $1^{st}$ frame of point cloud, and is determined as disappearing in the $6^{th}$ frame of point cloud (the obstacle is not detected in 2 consecutive frames, and is determined as disappearing), where the obstacle is detected in the point cloud frames including the $1^{st}$ frame, a $2^{nd}$ frame, and a $4^{th}$ frame, then an appearance rate of the obstacle within the corresponding life cycle is 3/6.

In some alternative implementations of the present embodiment, the above step 202 may be performed specifically as follows: for each obstacle of the at least one obstacle, the executing body may execute the following appearance rate determination step:

Step S1: establishing a tracking list for the obstacle based on the point cloud.

In the present implementation, the executing body can establish the tracking list for the obstacle based on the point cloud collected by the lidar. Here, the tracking list of the obstacle may include appearing times of the obstacle from the obstacle being detected until the obstacle disappearing. Here, the appearing time of the obstacle may refer to a time when the point cloud frame in which the obstacle is detected is collected. As an example, the obstacle will be detected in a plurality of frames of point cloud from the obstacle being detected until the obstacle disappearing, and times of collecting the plurality of frames of point cloud can be used as the appearing times of the obstacle.

Step S2: determining the appearance rate of the obstacle within the corresponding life cycle based on an appearing time of the obstacle recorded in the tracking list.

In the present implementation, the executing body can determine the appearance rate of the obstacle within the corresponding life cycle based on the appearing time of the obstacle recorded in the tracking list. As an example, the executing body can determine the number of point cloud frames in which the obstacle appears based on the tracking list for the obstacle, and then compute the ratio of the determined number to the total number of point cloud frames of the corresponding life cycle of the obstacle, thereby obtaining the appearance rate of the obstacle within the corresponding life cycle.

In some alternative implementations, the above step S1 may be performed specifically as follows:

First, in response to determining the obstacle being detected, determining whether the obstacle is a tracked obstacle based on the point cloud.

In the present implementation, in response to determining the obstacle being detected, the executing body can determine whether the obstacle is the tracked obstacle based on the point cloud collected by the lidar. In practice, when an obstacle is detected based on the point cloud, the executing body can determine whether the obstacle is a new obstacle detected for a first time, or a tracked obstacle that has been tracked.

Then, in response to determining the obstacle being the tracked obstacle, the appearing time of the detected obstacle and a grid region in which the obstacle is located when the obstacle appears are recorded in the tracking list that has been set for the obstacle.

In the present implementation, in response to determining the obstacle being the tracked obstacle, the executing body can record the appearing time of the detected obstacle and the grid region in which the obstacle is located when the obstacle appears into the tracking list that has been set for the obstacle. Here, the tracking list may include the appearing time of the obstacle and the grid region in which the obstacle located when the obstacle appears. Here, the grid region may be obtained by dividing a collection area of the above lidar.

Finally, in response to determining the obstacle not being a tracked obstacle, the tracking list is set for the obstacle, and the moment of appearance of the detected obstacle and the grid region of the obstacle at the appearance are recorded in the set tracking list.

In the present implementation, in response to determining the obstacle not being a tracked obstacle, the executing body can set the tracking list for the obstacle, and record the appearing time of the detected obstacle and the grid region in which the obstacle is located when the obstacle appears in the set tracking list. By the present implementation, the executing body can record the appearing time of the obstacle and the grid region in which the obstacle is located when the obstacle appears by establishing the tracking list.

Step 203: determining a confidence degree of a grid region of at least one grid region based on the appearance rates of the obstacles of the at least one obstacle.

In the present embodiment, the executing body can determine a confidence degree of each grid region of the at least one grid region based on an appearance rate of each obstacle of the at least one obstacle. Here, the at least one grid region may be obtained by dividing the collection area of the above lidar. Here, the grid region may be a square grid. As an example, in the traveling process of the vehicle, for each grid region in the at least one grid region, the executing body can perform statistical analysis on appearance rates of obstacles having appeared in the grid region, and determine the confidence degree of the grid region based on a statistical analysis result. For example, a weighted sum of the appearance rates of the obstacles having appeared in a grid region may be used as the confidence degree of the grid region.

In some alternative implementations of the present embodiment, the above step 203 may be performed specifically as follows: for each grid region of the at least one grid region, executing the following steps to determine the confidence degree:

First, counting the number of obstacles having appeared in the grid region based on the tracking lists of the obstacles of the at least one obstacle.

In the present implementation, the executing body can count the number of obstacles having appeared in the grid region based on the tracking list of each obstacle of the at least one obstacle. Here, a tracking list of an obstacle may include a grid region in which the obstacle is located from the obstacle being detected until the obstacle disappearing. It should be noted that a tracking list of an obstacle may further include other information related to the obstacle. For example, the tracking list of the obstacle may include an appearing time of the obstacle each time when the obstacle appears during the obstacle being detected for the first time until the obstacle disappearing, and a grid region in which the obstacle is located when the obstacle appears.

Then, a sum of the appearance rates of the obstacles having appeared in the grid region is determined.

In the present implementation, the executing body can determine the sum of the appearance rates of the obstacles having appeared in the grid region. As an example, the executing body can traverse the tracking list of each obstacle, determine which obstacles appear in the grid region, and compute a sum of appearance rates of all obstacles appearing in the grid region.

Finally, a ratio of the above-described sum to the above-described number is computed, and the obtained ratio is used as the confidence degree of the grid region.

In the present implementation, the executing body can compute the ratio of the above-described sum to the above-described number, and use the obtained ratio as the confidence degree of the grid region. For example, the executing body can compute the confidence degree of the grid region based on the following equation C:

$$C = \frac{\sum_{i=1}^{N_{total}} rate_i}{N_{total}},$$

$rate_i$ represents an appearance rate of an i-th obstacle, where $1 \leq i \leq N_{total}$; and $N_{total}$ represents the number of obstacles having appeared in the grid region.

Step 204: determining a target grid region from the at least one grid region based on the confidence degree, and determining whether an obstacle detected in the target grid region is an obstacle detected for a first time.

In the present embodiment, the executing body can determine the target grid region from the at least one grid region based on the confidence degree of each grid region obtained in step 203. As an example, the executing body can select, from the at least one grid region, a grid region with a confidence degree within a preset confidence degree interval for use as the target grid region. Here, the preset confidence degree interval may be set based on actual requirements. Then, the executing body can determine whether each obstacle detected in the target grid region is the obstacle detected for the first time.

In some alternative implementations of the present embodiment, the determining a target grid region from the at least one grid region based on the confidence degree in the above step 204 may be performed specifically as follows: selecting a grid region with a confidence degree less than a preset threshold from the at least one grid region for use as the target grid region.

In the present implementation, the executing body can select the grid region with the confidence degree less than the preset threshold from the at least one grid region, for use as the target grid region. For example, the lower is the confidence degree of a grid region, the lower is the credibility degree of point cloud data collected by the lidar within the grid region.

Step 205: in response to determining the obstacle detected in the target grid region being the obstacle detected for the first time, filtering out a point cloud corresponding to the obstacle detected for the first time in the target grid region.

In the present embodiment, in response to determining the obstacle detected in the target grid region being the obstacle detected for the first time, the executing body can filter out the point cloud corresponding to the obstacle detected for the first time in the target grid region. Here, the filtering out a point cloud corresponding to the obstacle may refer to filtering out the point cloud corresponding to the obstacle, without reporting the point cloud corresponding to the obstacle, and without sending control information to the vehicle based on the point cloud of the obstacle. The point cloud corresponding to the obstacle may refer to a point cloud composed of point data for describing the obstacle. In practice, the lower is the confidence degree of a grid region, the lower is the credibility degree of point cloud data collected by the lidar within the grid region, and the higher is the probability of an obstacle detected within the grid region being a falsely detected obstacle.

Figure 3:
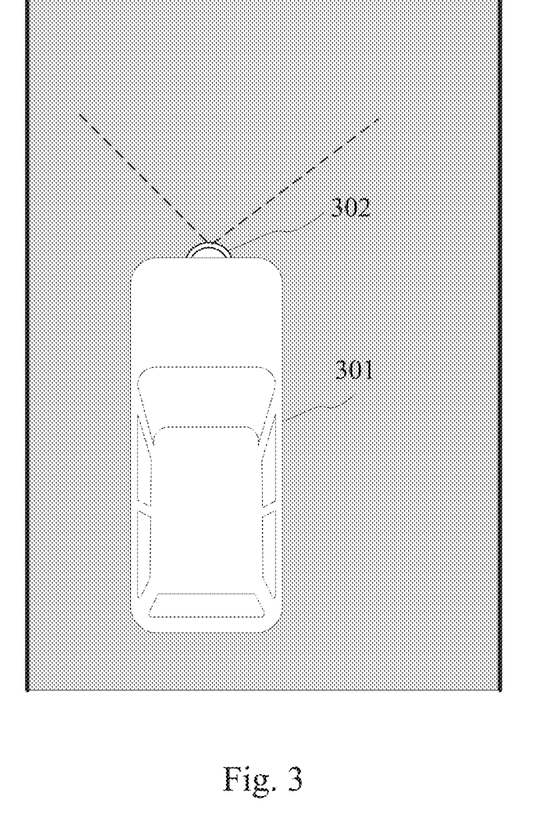
FIG. 3 is a schematic diagram of an application scenario of the method for processing information according to the present disclosure.

Further referring to FIG. 3, FIG. 3 is a schematic diagram of an application scenario of the method for processing information according to the present embodiment. In the application scenario of FIG. 3, an in-vehicle smart controller (not shown in the figure) in a vehicle 301 first identifies at least one obstacle from a point cloud collected by a lidar 302 during a traveling process of the vehicle, where the lidar 302 is a single-beam lidar installed at the bottom of the vehicle 301 at a position of a preset height above the ground. Then, for each obstacle of the at least one obstacle, the in-vehicle smart controller can determine an appearance rate of the obstacle within a corresponding life cycle. Then, the in-vehicle smart controller can determine a confidence degree of each grid region of at least one grid region based on the appearance rate of each obstacle of the at least one obstacle, finally determine a target grid region from the at least one grid region based on the confidence degree, determine whether an obstacle detected in the target grid region is an obstacle detected for a first time, and filter out, in response to determining the obstacle detected in the target grid region being the obstacle detected for the first time, a point cloud corresponding to the obstacle detected for the first time in the target grid region.

The method provided by the above embodiments of the present disclosure determines the target grid region based on the confidence degree of the grid region, and filters out the obstacle detected for the first time in the target grid region, thereby effectively filtering out a point cloud of the obstacle detected for the first time in the target grid region which has a low confidence degree, and reducing the impact of false detection of the obstacle on the traveling of the vehicle.

Figure 4:
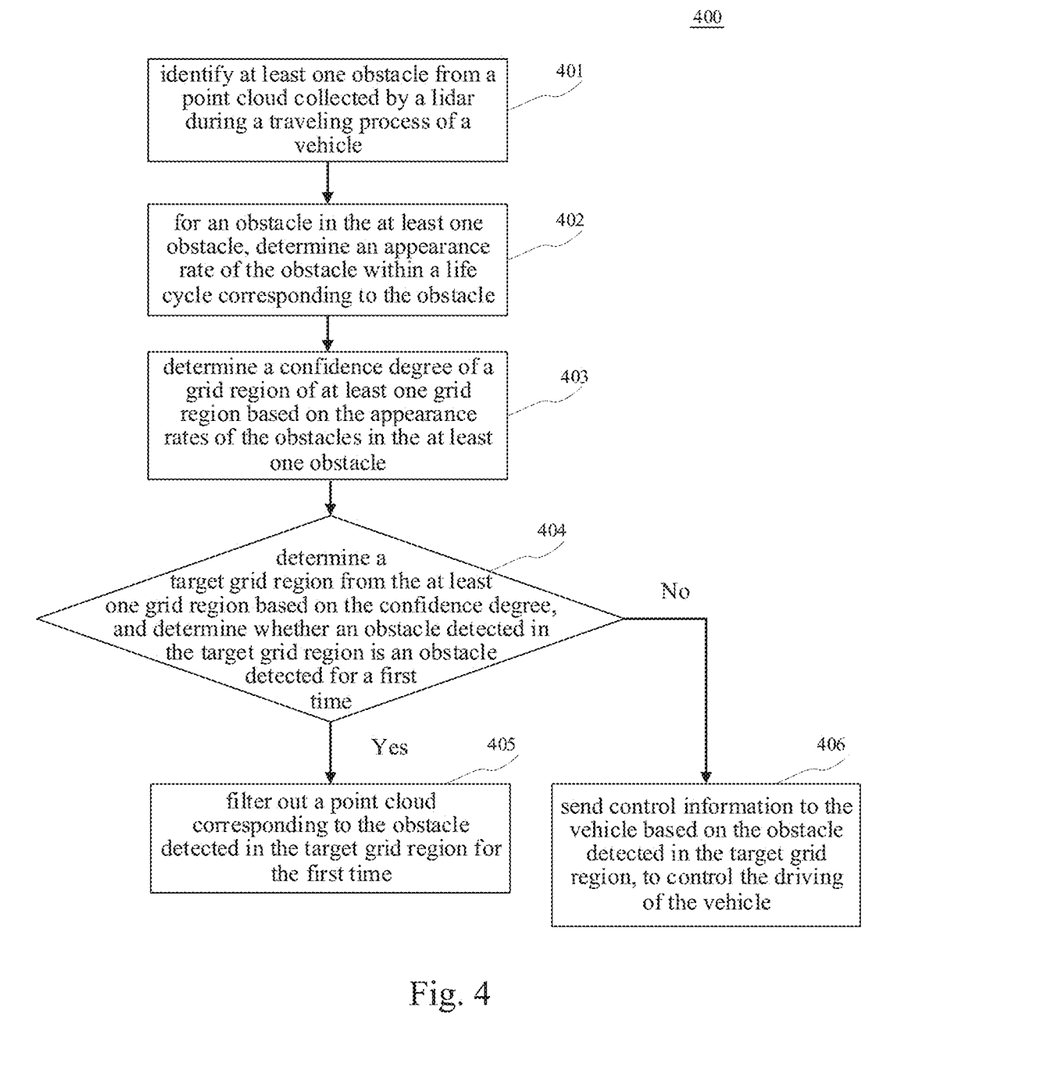
FIG. 4 is a flowchart of the method for processing information according to another embodiment of the present disclosure.

Further referring to FIG. 4, a process 400 of another embodiment of the method for processing information is shown. The process 400 of the method for processing information includes the following steps:

Step 401: identifying at least one obstacle from a point cloud collected by a lidar in a traveling process of a vehicle.

In the present embodiment, step 401 is similar to step 201 in the embodiment shown in FIG. 2. The description will not be repeated here.

Step 402: for each obstacle of the at least one obstacle, determining an appearance rate of the obstacle within a corresponding life cycle.

In the present embodiment, step 402 is similar to step 202 in the embodiment shown in FIG. 2. The description will not be repeated here.

Step 403: determining a confidence degree of a grid region of at least one grid region based on the appearance rates of the obstacles of the at least one obstacle.

In the present embodiment, step 403 is similar to step 203 in the embodiment shown in FIG. 2. The description will not be repeated here.

Step 404: determining a target grid region from the at least one grid region based on the confidence degree, and determining whether an obstacle detected in the target grid region is an obstacle detected for a first time.

In the present embodiment, step 404 is similar to step 204 in the embodiment shown in FIG. 2. The description will not be repeated here.

Step 405: in response to determining the obstacle detected in the target grid region being the obstacle detected for the first time, filtering out a point cloud corresponding to the obstacle detected for the first time in the target grid region.

In the present embodiment, step 405 is similar to step 205 in the embodiment shown in FIG. 2. The description will not be repeated here.

Step 406: in response to determining the obstacle detected in the target grid region not being the obstacle detected for the first time, sending control information to the vehicle based on the obstacle detected in the target grid region, to control the traveling of the vehicle.

In the present embodiment, in response to determining the obstacle detected in the target grid region not being the obstacle detected for the first time, an executing body can send control information to the vehicle based on the obstacle detected in the target grid region, to control the traveling of the vehicle. As an example, the executing body can predict, based on the position and moving speed of the obstacle, and a traveling speed of the vehicle, whether the vehicle will collide with the obstacle if the vehicle continues traveling at a current speed. In response to predicting that the vehicle will not collide with the obstacle if the vehicle continues traveling at the current speed, the executing body can control the vehicle to continue traveling at the current speed; and in response to predicting that the vehicle will collide with the obstacle if the vehicle continues traveling at the current speed, the executing body can send the control information to the vehicle, to control the vehicle to avoid the collision with the obstacle. For example, the above control information may be used for controlling the vehicle to stop traveling, or to bypass the obstacle for traveling.

As can be seen from FIG. 4, compared with the embodiment corresponding to FIG. 2, a process 400 of the method for processing information in the present embodiment highlights the sending, in response to determining the obstacle detected in the target grid region not being the obstacle detected for the first time, control information to the vehicle based on the obstacle detected in the target grid region. Therefore, the solutions described in the present embodiment can ensure that, whilst reducing the impact of false detection of the obstacle on the traveling of the vehicle, the vehicle avoids a normally detected obstacle, thereby ensuring the traveling security of the vehicle.

Figure 5:
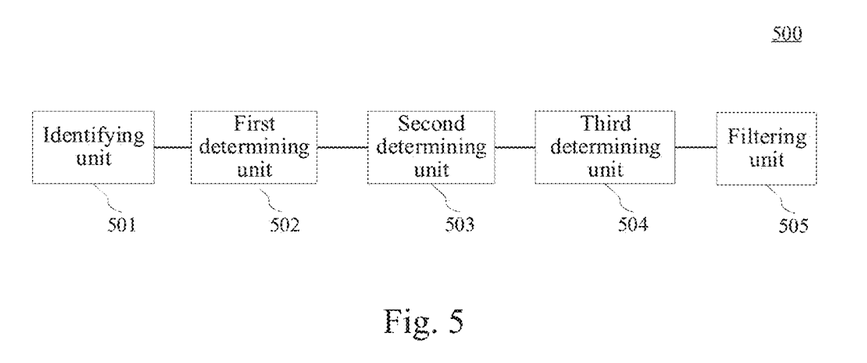
FIG. 5 is a schematic structural diagram of an apparatus for processing information according to an embodiment of the present disclosure.

Further referring to FIG. 5, as an implementation of the method shown in the above figures, an embodiment of the present disclosure provides an apparatus for processing information. The embodiment of the apparatus corresponds to the embodiment of the method shown in FIG. 2. The apparatus may be specifically applied to various electronic devices.

As shown in FIG. 5, the apparatus 500 for processing information of the present embodiment includes: an identifying unit 501, a first determining unit 502, a second determining unit 503, a third determining unit 504, and a filtering unit 505. The identifying unit 501 is configured to identify at least one obstacle from a point cloud, the point cloud being collected by a lidar during a traveling process of a vehicle; the first determining unit 502 is configured to determine, for an obstacle in the at least one obstacle, an appearance rate of the obstacle within a life cycle corresponding to the obstacle, the life cycle corresponding to the obstacle referring to a process from the obstacle being detected until the obstacle disappearing; the second determining unit 503 is configured to determine a confidence degree of a grid region of at least one grid region based on appearance rates of the obstacles in the at least one obstacle, the at least one grid region being obtained by dividing a collection area of the lidar; the third determining unit 504 is configured to determine a target grid region from the at least one grid region based on the confidence degree, and determine whether an obstacle detected in the target grid region is an obstacle detected for a first time; and the filtering unit 505 is configured to filter out, in response to determining the obstacle detected in the target grid region being the obstacle detected for the first time, a point cloud corresponding to the obstacle detected in the target region for the first time.

The specific processing of the identifying unit 501, the first determining unit 502, the second determining unit 503, the third determining unit 504, and the filtering unit 505 of the apparatus 500 for processing information and the technical effects thereof in the present embodiment may refer to the related description of step 201, step 202, step 203, step 204, and step 205 in the corresponding embodiment of FIG. 2, respectively. The description will not be repeated here.

In some alternative implementations of the present embodiment, the apparatus 500 further includes: a sending unit (not shown in the figure) configured to send, in response to determining the obstacle detected in the target grid region not being the obstacle detected for the first time, control information to the vehicle based on the obstacle detected in the target grid region, to control the traveling of the vehicle.

In some alternative implementations of the present embodiment, the first determining unit 502 is further configured to execute, for the obstacle in the at least one obstacle, preset appearance rate determining steps, and the first determining unit 502 includes: an establishing unit (not shown in the figure) configured to establish a tracking list for the obstacle based on the point cloud, where the tracking list includes appearing times of the obstacle during the process from the obstacle being detected until the obstacle disappearing; and an appearance rate determining unit (not shown in the figure) configured to determine the appearance rate of the obstacle within the life cycle corresponding to the obstacle based on appearing times of the obstacle recorded in the tracking list.

In some alternative implementations of the present embodiment, the establishing unit is further configured to: determine, based on the point cloud, in response to determining the obstacle being detected, whether the detected obstacle is a tracked obstacle; in response to determining the detected obstacle being a tracked obstacle, record an appearing time of the detected obstacle and a grid region in which the obstacle is located when the obstacle appears into the tracking list that has been set for the obstacle; and in response to determining the obstacle not being the tracked obstacle, set a tracking list for the obstacle, and record the appearing time of the detected obstacle and the grid region in which the detected obstacle is located when the detected obstacle appears into the set tracking list.

In some alternative implementations of the present embodiment, the second determining unit 503 is further configured to: for the grid region of the at least one grid region, execute following steps to determine the confidence degree: count, based on tracking lists of the obstacles in the at least one obstacle, the number of obstacles having appeared in the grid region, where a tracking list includes a grid region in which the obstacle is located from the obstacle being detected until the obstacle disappearing; determining a sum of appearance rates of the obstacles having appeared in the grid region; and computing a ratio of said sum to said number, and using the obtained ratio as the confidence degree of the grid region.

In some alternative implementations of the present embodiment, the third determining unit 504 is further configured to: select a grid region with a confidence degree less than a preset threshold from the at least one grid region, for use as the target grid region.

Figure 6:
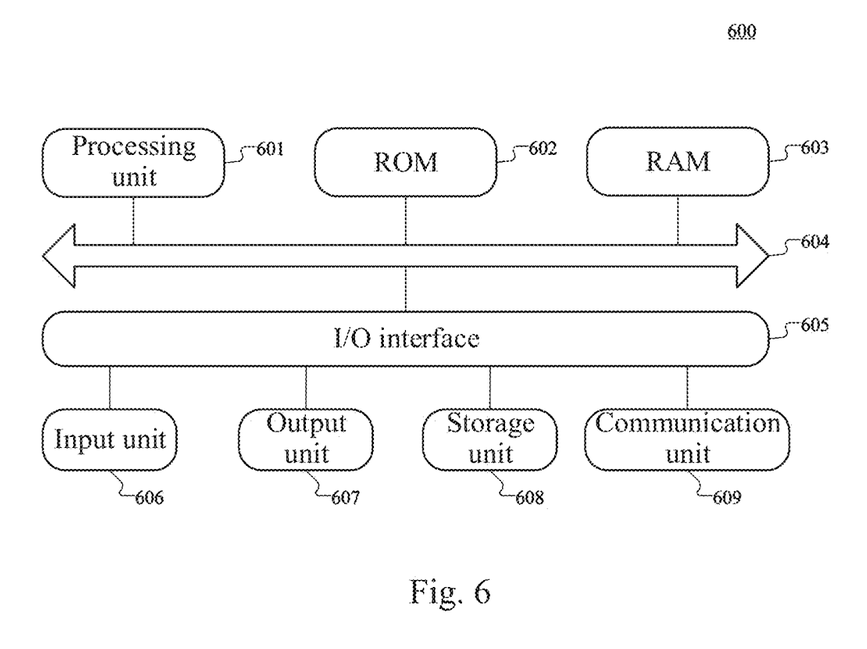
FIG. 6 is a schematic structural diagram of a computer system adapted to implement an electronic device of embodiments of the present disclosure.

Referring to FIG. 6, a schematic structural diagram of an electronic device 600 (such as the server shown in FIG. 1 or the in-vehicle smart controller installed on the vehicles 101, 102, 103) adapted to implement some embodiments of the present disclosure is shown.

As shown in FIG. 6, the electronic device 600 includes a processing unit 601 (such as a central processing unit or a graphic processing unit), which may execute various appropriate actions and processes in accordance with a program stored in a read-only memory (ROM) 602 or a program loaded into a random access memory (RAM) 603 from a storage unit 608. The RAM 603 also stores various programs and data required by operations of the electronic device 600. The CPU 601, the ROM 602 and the RAM 603 are connected to each other through a bus 604. An input/output (I/O) interface 605 is also connected to the bus 604.

Normally, the following components are connected to the I/O interface 605: an input unit 606 including a touch screen, a touch pad, a keyboard, a mouse, a camera, a microphone, an accelerometer, a gyroscope, etc.; an output unit 607 comprising a liquid crystal display device (LCD), a speaker, a vibrator etc.; a storage unit 608 including a magnetic tape, a hard disk and the like; and a communication unit 609. The communication unit 609 may allow the electronic device 600 to perform wired or wireless communication with other devices to exchange data. Although FIG. 6 shows the electronic device 600 having various units, it should be understood that it is not required to implement or have all the units shown. It may alternatively be implemented or provided with more or fewer units. Each block shown in FIG. 6 can represent one units or multiple units as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication unit 609, or may be installed from the storage unit 608, or may be installed from the ROM 602. The computer program, when executed by the processing unit 601, implements the above mentioned functionalities as defined by the methods of the present disclosure.

It should be noted that the computer readable medium of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above described computer-readable storage medium may be the computer storage medium included in the electronic device in the above described embodiments, or a stand-alone computer-readable storage medium not assembled into the apparatus. The computer-readable storage medium stores one or more programs. The one or more programs, when executed by a device, cause the device to: identify at least one obstacle from a point cloud, the point cloud being collected by a lidar during a traveling process of a vehicle; for an obstacle in the at least one obstacle, determining an appearance rate of the obstacle within a life cycle corresponding to the obstacle, the life cycle corresponding to the obstacle referring to a process from the obstacle being detected until the obstacle disappearing; determining a confidence degree of a grid region of at least one grid region based on appearance rates of obstacles in the at least one obstacle, the at least one grid region being obtained by dividing a collection area of the lidar; determining a target grid region from the at least one grid region based on the confidence degree, and determining whether an obstacle detected in the target grid region is an obstacle detected for a first time; and in response to determining the obstacle detected in the target grid region being the obstacle detected for the first time, filtering out a point cloud corresponding to the obstacle detected in the target grid region for the first time.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an identifying unit, a first determining unit, a second determining unit, a third determining unit, and a filtering unit, where the names of these units or modules do not in some cases constitute a limitation to such units or modules themselves. For example, the identifying unit may also be described as "a unit for identify at least one obstacle from a point cloud, the point cloud being collected by a lidar during a traveling process of a vehicle."

The above description only provides an explanation of the preferred embodiments of the present disclosure and the technical principles used. It should be appreciated by those skilled in the art that the inventive scope of some embodiments of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in some embodiments of the present disclosure are examples.

What is claimed is:

1. A method for processing information, comprising:
identifying at least one obstacle from a point cloud, the point cloud being collected by a lidar during a traveling process of a vehicle;
for an obstacle in the at least one obstacle, determining an appearance rate of the obstacle within a life cycle corresponding to the obstacle, the life cycle corresponding to the obstacle referring to a process from the obstacle being detected until the obstacle disappears, and the appearance rate of the obstacle within the life cycle referring to a ratio of a number of frames in which the obstacle appears within the life cycle to a total number of frames within the life cycle;
determining a confidence degree of a grid region of at least one grid region based on appearance rates of obstacles in the at least one obstacle, the at least one grid region being obtained by dividing a collection area of the lidar;
determining a target grid region from the at least one grid region based on the confidence degree;
determining whether an obstacle detected in the target grid region is an obstacle detected for a first time; and
in response to determining the obstacle detected in the target grid region being the obstacle detected for the first time, filtering out a point cloud corresponding to the obstacle detected in the target grid region for the first time.

2. The method according to claim 1, wherein the method further comprises:
in response to determining the obstacle detected in the target grid region not being the obstacle detected for the first time, sending control information to the vehicle based on the obstacle detected in the target grid region, to control the traveling process of the vehicle.

3. The method according to claim 1, wherein for an obstacle in the at least one obstacle, determining an appearance rate of the obstacle within a life cycle corresponding to the obstacle comprises:
for the obstacle in the at least one obstacle, executing following to determine the appearance rate:
establishing a tracking list for the obstacle based on the point cloud, wherein the tracking list includes appearing times of the obstacle during the process from the obstacle being detected until the obstacle disappears; and
determining the appearance rate of the obstacle within the life cycle corresponding to the obstacle based on the appearing times of the obstacle recorded in the tracking list.

4. The method according to claim 3, wherein establishing a tracking list for the obstacle based on the point cloud comprises:
based on the point cloud, in response to determining the obstacle being detected, determining whether the detected obstacle is a tracked obstacle;
in response to determining the detected obstacle being the tracked obstacle:
recording an appearing time of the detected obstacle and the grid region in which the obstacle is located when the obstacle appears into the tracking list that has been set for the obstacle; and
in response to determining the obstacle not being the tracked obstacle:
setting the tracking list for the detected obstacle; and
recording the appearing time of the detected obstacle and the grid region in which the detected obstacle is located when the detected obstacle appears into the set tracking list.

5. The method according to claim 1, wherein determining a confidence degree of a grid region of at least one grid region based on the appearance rates of the obstacles of the at least one obstacle comprises:
for the grid region of the at least one grid region, executing following steps to determine the confidence degree:
counting, based on tracking lists of the obstacles in the at least one obstacle, a number of obstacles having appeared in the grid region, wherein a tracking list includes the grid region in which the obstacle is located from the obstacle being detected until the obstacle disappears;
determining a sum of appearance rates of the obstacles having appeared in the grid region; and
computing a ratio of said sum to said number, and using the obtained ratio as the confidence degree of the grid region.

6. The method according to claim 1, wherein determining a target grid region from the at least one grid region based on the confidence degree comprises:
selecting the grid region with the confidence degree less than a preset threshold from the at least one grid region, for use as the target grid region.

7. An apparatus for processing information, comprising:
at least one processor; and
a memory storing instructions, the instructions when executed by the at least one processor, cause the at least one processor to perform operations, the operations comprising:
identifying at least one obstacle from a point cloud, the point cloud being collected by a lidar during a traveling process of a vehicle;
for an obstacle in the at least one obstacle, determining an appearance rate of the obstacle within a life cycle corresponding to the obstacle, the life cycle corresponding to the obstacle referring to a process from the obstacle being detected until the obstacle disappears, and the appearance rate of the obstacle within the life cycle referring to a ratio of a number of frames in which the obstacle appears within the life cycle to a total number of frames within the life cycle;
determining a confidence degree of a grid region of at least one grid region based on appearance rates of obstacles in the at least one obstacle, the at least one grid region being obtained by dividing a collection area of the lidar;
determining a target grid region from the at least one grid region based on the confidence degree;
determining whether an obstacle detected in the target grid region is an obstacle detected for a first time; and
in response to determining the obstacle detected in the target grid region being the obstacle detected for the first time, filtering out a point cloud corresponding to the obstacle detected in the target grid region for the first time.

8. The apparatus according to claim 7, wherein the operations further comprise:
sending, in response to determining the obstacle detected in the target grid region not being the obstacle detected for the first time, control information to the vehicle based on the obstacle detected in the target grid region, to control the traveling process of the vehicle.

9. The apparatus according to claim 7, wherein for an obstacle in the at least one obstacle, determining an appearance rate of the obstacle within a life cycle corresponding to the obstacle comprises:
executing, for the obstacle in the at least one obstacle, the following preset appearance rate determining steps:
establishing a tracking list for the obstacle based on the point cloud, wherein the tracking list includes appearing times of the obstacle during the process from the obstacle being detected until the obstacle disappears; and
determining the appearance rate of the obstacle within the life cycle corresponding to the obstacle based on appearing times of the obstacle recorded in the tracking list.

10. The apparatus according to claim 9, wherein the establishing a tracking list for the obstacle based on the point cloud comprises:
determining, based on the point cloud, in response to determining the obstacle being detected, whether the detected obstacle is a tracked obstacle;
in response to determining the detected obstacle being the tracked obstacle:
recording an appearing time of the detected obstacle and the grid region in which the obstacle is located when the obstacle appears into the tracking list that has been set for the obstacle; and
in response to determining the obstacle not being the tracked obstacle:
setting the tracking list for the detected obstacle; and
recording the appearing time of the detected obstacle and the grid region in which the detected obstacle is located when the detected obstacle appears into the set tracking list.

11. The apparatus according to claim 7, wherein determining a confidence degree of a grid region of at least one grid region based on the appearance rates of the obstacles of the at least one obstacle comprises:
for the grid region of the at least one grid region, executing the following steps to determine the confidence degree:
counting, based on tracking lists of the obstacles in the at least one obstacle, a number of obstacles having appeared in the grid region, wherein a tracking list includes the grid region in which the obstacle is located from the obstacle being detected until the obstacle disappears;
determining a sum of appearance rates of the obstacles having appeared in the grid region; and
computing a ratio of said sum to said number, and using the obtained ratio as the confidence degree of the grid region.

12. The apparatus according to claim 7, wherein determining a target grid region from the at least one grid region based on the confidence degree comprises:
selecting the grid region with the confidence degree less than a preset threshold from the at least one grid region, for use as the target grid region.

13. A non-transitory computer readable medium, storing a computer program thereon, wherein the program, when executed by a processor, cause the processor to perform operations, the operations comprising:
identifying at least one obstacle from a point cloud, the point cloud being collected by a lidar during a traveling process of a vehicle;
for an obstacle in the at least one obstacle, determining an appearance rate of the obstacle within a life cycle corresponding to the obstacle, the life cycle corresponding to the obstacle referring to a process from the obstacle being detected until the obstacle disappears, and the appearance rate of the obstacle within the life cycle referring to a ratio of a number of frames in which the obstacle appears within the life cycle to a total number of frames within the life cycle;
determining a confidence degree of a grid region of at least one grid region based on appearance rates of obstacles in the at least one obstacle, the at least one grid region being obtained by dividing a collection area of the lidar;
determining a target grid region from the at least one grid region based on the confidence degree;
determining whether an obstacle detected in the target grid region is an obstacle detected for a first time; and
in response to determining the obstacle detected in the target grid region being the obstacle detected for the first time, filtering out a point cloud corresponding to the obstacle detected in the target grid region for the first time.

14. The medium according to claim 13, wherein the operations further comprise:
in response to determining the obstacle detected in the target grid region not being the obstacle detected for the first time, sending control information to the vehicle based on the obstacle detected in the target grid region, to control the traveling process of the vehicle.

15. The medium according to claim 13, wherein for an obstacle in the at least one obstacle, determining an appearance rate of the obstacle within a life cycle corresponding to the obstacle comprises:
for the obstacle in the at least one obstacle, executing the following to determine the appearance rate:
establishing a tracking list for the obstacle based on the point cloud, wherein the tracking list includes appearing times of the obstacle during the process from the obstacle being detected until the obstacle disappears; and
determining the appearance rate of the obstacle within the life cycle corresponding to the obstacle based on the appearing times of the obstacle recorded in the tracking list.

16. The medium according to claim 15, wherein for the obstacle in the at least one obstacle, executing the following to determine the appearance rate:
establishing the tracking list for the obstacle based on the point cloud, wherein the tracking list includes appearing times of the obstacle during the process from the obstacle being detected until the obstacle disappears; and
determining the appearance rate of the obstacle within the life cycle corresponding to the obstacle based on the appearing times of the obstacle recorded in the tracking list.

17. The medium according to claim 13, wherein determining a confidence degree of a grid region of at least one grid region based on the appearance rates of the obstacles of the at least one obstacle comprises:
for the grid region of the at least one grid region, executing the following steps to determine the confidence degree:
counting, based on tracking lists of the obstacles in the at least one obstacle, a number of obstacles having appeared in the grid region, wherein a tracking list includes a grid region in which the obstacle is located from the obstacle being detected until the obstacle disappears;
determining a sum of appearance rates of the obstacles having appeared in the grid region; and
computing a ratio of said sum to said number, and using the obtained ratio as the confidence degree of the grid region.

18. The medium according to claim 13, wherein determining a target grid region from the at least one grid region based on the confidence degree comprises:
selecting the grid region with the confidence degree less than a preset threshold from the at least one grid region, for use as the target grid region.

* * * * *